United States Patent [19]
Tayler et al.

[11] Patent Number: 4,882,642
[45] Date of Patent: Nov. 21, 1989

[54] SEQUENTIALLY PROCESSING DATA IN A CACHED DATA STORAGE SYSTEM

[75] Inventors: Gerald E. Tayler, Berthoud, Colo.; Robert E. Wagner, Tucson, Ariz.

[73] Assignee: International Business Machines Corporation, Armonk, N.Y.

[21] Appl. No.: 68,857

[22] Filed: Jul. 2, 1987

[51] Int. Cl.$^4$ ............................................. G06F 9/00
[52] U.S. Cl. .................................. 360/78.11; 364/900; 364/959.3; 364/964.2
[58] Field of Search ............................ 364/200, 900; 360/78.11, 78.12

[56] References Cited

U.S. PATENT DOCUMENTS

| | | | |
|---|---|---|---|
| 3,898,624 | 8/1975 | Tobias | 364/200 |
| 4,414,644 | 11/1983 | Tayler | 364/900 |
| 4,466,059 | 8/1984 | Bastian et al. | 364/200 |
| 4,611,315 | 9/1986 | Ogino | 360/78.11 |
| 4,633,343 | 12/1986 | Maury et al. | 360/78.12 |
| 4,796,247 | 1/1989 | Vogel Sang | 360/78.11 |

Primary Examiner—Gareth D. Shaw
Assistant Examiner—John G. Mills
Attorney, Agent, or Firm—H. F. Somermeyer

[57] ABSTRACT

The disclosure relates to sequential performance of a cached data storage subsystem with a minimal control signal processing. Sequential access is first detected by monitoring and examining the quantity of data accessed per unit of data storage (track) across a set of contiguously addressable tracks. Since the occupancy of the data in the cache is usually time limited, this examination provides an indication of the rate of sequential processing for a data set, i.e., a data set is being processed usually in contiguously addressable data storage units of a data storage system. Based upon the examination of a group of the tracks in a cache, the amount of data to be promoted to the cache from a backing store in anticipation of future host processor references is optimized. A promotion factor is calculated by combining the access extents monitored in the individual data storage areas and is expressed in a number of tracks units to be promoted. The examination of the group of tracks units and the implementation of the data promotion and demotion (early cast-out) is synchronized which results in a synergistic effect for increasing throughput of the cache for sequentially-processed data. A limit of promotion is determined to create a window of sequential data processing.

19 Claims, 2 Drawing Sheets

SEQUENTIALLY PROCESSING DATA IN A CACHED DATA STORAGE SYSTEM

DOCUMENTS INCORPORATED BY REFERENCE

U.S. Pat. No. 4,414,644 shows a commanded sequential caching mode.

U.S. Pat. No. 4,464,713 shows a cache addressing apparatus.

U.S. Pat. No. 4,466,059 shows a random access caching mode.

U.S. Pat. No. 4,583,166 shows a so-called roll mode of accessing data areas on a rotating record disk.

U.S. Pat. No. 4,262,332 shows a define extent control for use with the present invention.

U.S. Pat. No. 4,500,954 shows an implicit cache bypass for transferring data between a host processor and DASD.

BACKGROUND OF THE INVENTION

Field of the Invention

The present invention relates to data storage subsystems which are attachable to host processors, particularly those data storage subsystems employing a cache (fast access data storage portion) interposed between the host processors and a backing store. Typically a backing store is a disk recorder, such as a magnetic or optical disk unit.

Discussion of the Prior Art

Peripheral data storage hierarchies have been used for years for providing an apparent store as suggested by Eden et al in U.S. Pat. No. 3,569,938. Eden et al teach that in a demand paging or request system, caching data in a high-speed front store (also termed a buffer) can make a peripheral data storage subsystem appear to have a large data storing capacity yet provide for more rapid access to data than would be provided by a usual backing store, such as a disk recorder. Eden et al also teach that the backing store can be retentive, such as magnetic tape recorders and disk recorders, while a front store can be a volatile store, such as a magnetic core store. With advances in data storage technology, the front store now typically includes a semiconductive-type data storage elements, for example as seen in U.S. Pat. No. 3,839,704.

A main purpose in providing the cache is to enhance the performance. Enhanced performance means reduced access time to any requested unit of data, as well as providing faster transfer of the data from the data storage subsystem to a requesting host processor, or in the reverse, accepting data at a faster rate than would be provided if the host processor were directly recording into a backing store. One of the problems in providing such enhanced performance is that computer programs or processes executed in the host processor have different operational characteristics. That is, some programs will access and record data in what can be termed a random access mode. In such instances, the amount of data sequentially transferred is minimal. A set of references or accesses to the data typically do not involve large amounts of data but "randomly" access data storage locations. Other computer processes executed in a host processor sequentially access large amounts of data which are processed quickly such that the input/output rate of the host processor is extremely high. If the cache and the residency of data in the cache are designed to enhance the operation of the random access processes, then the performance of the highly sequential processes are degraded. Of course it should also be realized that computer processes demand different I/0 characteristics intermediate the random and sequential processing. All of these differences result in differing host processor performances using a cached peripheral data storage subsystem.

Attempts have been made to improve the performance for both random and sequential processes by having the host processor indicate to the data storage system whether the process results in a random I/0 procedure or a sequential I/0 procedure. One such arrangement is shown by Bastian et al in U.S. Pat. No. 4,466,059. Reference is made particularly to FIG. 3 of Bastian et al. There, Bastian et al teach that the data processing input/output operations are handled in so-called chains of command. Such chains of command are generated by a so-called channel processor within the host processor. Upon the completion of one chain of peripheral operations, corresponding to the execution of a single channel program, a control unit managing the cache and the backing store (in the case of Bastian et al they illustrate a magnetic disk recorder as the backing store) the character of the data transmissions in the just previously executed chain of peripheral operations is examined. Included in this examination is whether or not the host processor supplied a sequential bit, i.e., indicate that the I/O process is to be an input/output sequential operation. Also, the types of data recording operations were examined, i.e. were there combinations of recording operations with the sequential bit. Then certain tracks of data (a track of data is the amount of data storable on one track of the magnetic disk recorder) are deleted from the cache, i.e., transferred from the cache to the backing store and erased from the cache. Also, it was examined whether or not any writing by a host processor occurred during the chain of operation, i.e., did the host processor only read data from the subsystem? If reading only occurred and a sequential bit is set, then the next track of the disk recorder is transferred to cache. It should be remembered that in sequential data, the normal process for a host processor to process the data is to go from a low address to a higher address in any data storage unit. Accordingly, a next track means a track having a backing store address one greater than the backing store address of the track currently being accessed in the cache. Of course, if such next track is already resident in the cache, it would not be promoted from the backing store to the cache store. In the arrangement taught by Bastian et al, the just-described operations are performed immediately upon the conclusion of the chain peripheral operation or immediately before a chain of operation is to be next executed. The advantage of the latter is that it could avoid unnecessarily promoting one track of data to the cache. The Bastian et al patent appears to be directed toward primarily random type of computer processes, i.e., the teaching is that write hits are to be discouraged and read hits are to be encouraged. The addition of the sequential bit is an accommodation and a recognition that sequential data processing is important, and it is important to have reasonable performance for such sequential data processing.

While the Bastian et al technique provides for enhanced performance for many computer processes, there are still many computer processes that could be enhanced further by improving the sequential processing of data in the data storage subsystem such that the computer process would not have to wait for completion of data transfers. It is also desired that a sequential mode of operation be implicitly detected rather than always require the host processor to command or declare a sequential mode of operation for each and every computer process that would benefit from a sequential mode of operation.

An example of a data promotion scheme adapted primarily for a high rate of sequential processing is shown in Tayler, U.S. Pat. No. 4,414,644. Tayler requires that the host processor not only indicate that data is to be sequentially processed but also the extent of that data to be sequentially processed. That is, an entire locality of references for a given computer process is declared to the data storage subsystem. In this event, when the host accessed to the cache results in a cache miss on a read operation, then all of the data to be found in an immediate locality of references that was declared to the data storage subsystem are promoted to cache. While this procedure certainly enhances a high rate of sequential processing, it also uses an extremely large amount of cache data storage space. Since a large number of computer processes may be sharing the cache, such large usage for a single process may be detrimental to the efficiency of a data processing installation. Therefore, the use of Tayler technique for sequential processing is useful in certain situations, but is not necessarily efficient in other data processing situations.

It is also to be recognized that magnetic disk recorders have been used for years with host processors. Accordingly, many computer processes which were established long before caching was commonly used in a peripheral data storage subsystem optimized the computer process by accommodating the physical parameters of magnetic disk recorders. Such physical parameters include latency time of the disk rotation and the seek time in changing from one set of tracks to another plus the knowledge of data storing cylinders, i.e., a set of tracks having a common radius on a set of stacked record disks mounted on a common spindle for rotation. Such cylinders resulted in almost zero track switch time in that electronic circuits were used to switch between the various transducers on the respective data storing surfaces of the disk within a single cylinder of tracks. Based upon this knowledge, certain computer processes transfer data from a complete cylinder of tracks as a single multitrack I/O operation. In such a multitrack operation, the intervention of a cache store in the data transfer process normally increases the access time, thereby unintentionally reducing performance of computer process. It is desired to avoid such degradation of performance for any program.

Accordingly, a plurality of modes of operation which are implicitly determined are desired for a cached peripheral data storage subsystem.

Tobias in U.S. Pat. No. 3,898,624 shows a processor cache interposed between host processor circuits and a so-called main memory. The cache occupancy is determined by an operator using a system console of the system The system console indicates to the cache control circuits of the processor cache the type of prefetching required for enhancing the performance of a given computer process currently being executed. Tobias provides for eight different states based upon the operations to be performed. The eight states have different prefetch characteristics for enhancing the respective computer processes. For example, instruction prefetch has different prefetch characteristics than an operand prefetch, which is different in turn from a "channel" prefetch. Such operations are commanded from the system console, i.e., are effectively manually selected. While such differing prefetches are tuned to the type of operation do provide enhanced performance, it is desired to accommodate other parameters which affect differing input/output data rates in sequential data processing. For example, a peripheral data storage subsystem can be attached to a plurality of host processors. Each of the host processors can have a different computing capability resulting in differing data rates in their respective input/output (I/O) operations. For example, if the same program or process were executed in a highly capable host processor, a relatively high input/output rate would be demanded to provide for efficient process execution. This I/O operation requires a greater amount of prefetch independent of the type of program or operation being performed. In contrast, when such a program is executed on a lower capacity host processor, then the input/output sequential rate could be reduced. It is desire, therefore, to implicitly determine the rate of sequential processing in a host processor and adjust peripheral data storage operations in accordance with such implicit determination of host processor execution rates.

SUMMARY OF THE INVENTION

It is an object of the present invention to provide for management of a cache unit of a peripheral data storage subsystem by implicitly determining the apparent input/output rate for any computer process on any host processor accessing the data storage subsystem whether it be for recording data in the subsystem or for reading data from the subsystem.

In one aspect of the invention, a group of tracks in a cache in a peripheral data storage subsystem are selected with the access extents in the group of tracks being measured and the measurements stored for later analysis. Access extents are the total number of data bytes storage locations in a track accessed by a host processor during the current cache track allocation. The access extents are analyzed in a small group of allocated cache tracks. When a number of cache tracks less than desired for a group are not in the cache, then the analysis is dispensed with, i.e., no sequential mode will be implicitly determined. The access extents of the individual cache tracks in a group are analyzed and combined into a single figure for generating a promotion factor (PF) which is used for determining the number of backing store tracks of data to be promoted and kept promoted in the cache, and, optionally, number of cache data stored in a track which may be demoted from the cache. The analysis is directed to a last cache track accessed by a host processor. Allocated cache tracks having immediately smaller backing store addresses but which are resident in the cache are combined with the last cache track accessed from a group. This group is a selected group of cache tracks. When the access extents of such selected group exceed a threshold, then a number of tracks of data are transferred from the backing store to the cache which have addresses immediately above the backing store address last access track in cache. The PF factor determines the number of tracks of data to be promoted. The PF factor indicates a sequential I/O rate of the computer process using the I/O operation. This algorithm is a so-called "rolling" algorithm in that the last cache track accessed always has the highest backing store address in the selected group which have access extents determining the number of tracks of data to be deleted from cache and the number of tracks of data to be promoted to cache from the backing store. The deletion of data from cache tracks can be controlled by a least recently used algorithm rather than using the sequential analysis for deleting or casting out data from the cache. Once a sequential mode is set for a given cache track, that mode is maintained until that track is itself cast out.

In another aspect of the invention, a limit on the value of PF is set such that the implicit determination of sequentialness is limited to prefetching a predetermined maximum number of tracks of data. When the prefetching is limited, it not only is cache space conserved, but also enablement is provided for a computer process to bypass cache for transferring extremely large amounts of data from a backing store and a host processor, such as a complete cylinder of data in a multi-disk data recorder.

The foregoing and other objects, features and advantages of the invention will be apparent from the following more particular description of preferred embodiments of the invention, as illustrated in the accompanying drawings.

DETAILED DESCRIPTION

Figure 1:
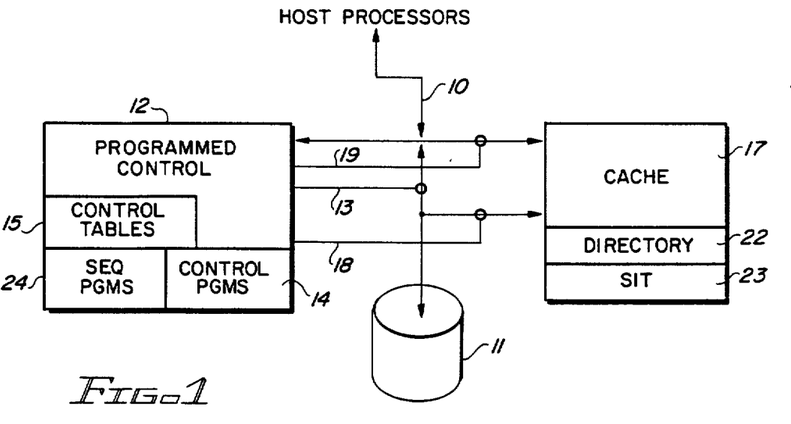
FIG. 1 is a simplified block diagram of a peripheral data storage subsystem which employs the teachings of the present invention.

Referring now more particularly to the appended drawings, like numerals indicate like features in the various figures. Referring more particularly to FIG. 1, the environment in which the invention is practiced is described. One or more host processors are connected to the illustrated data storage subsystem via an attachment or channel 10. The data storage subsystem includes one or more data storage devices 11, preferably disk recorders also referred to as direct access storage devices (DASD). A programmed control 12 in the peripheral data storage subsystem controls the subsystem operations and the transfer of data between DASD 11 and host processors through attachment 10. Line 13 indicates this control function, which is well known. Programmed control 12 has its own microprocessor (not shown), such as seen in U.S. Pat. No. 4,466,059. Particularly refer to FIG. 2 of the cited patent which shows the hardware arrangement which may be advantageously employed with the present invention. Programmed control 12 has its own control program storage which includes a set of control programs (pgms) 14. The microprocessor in programmed control 12 reads the control programs and responds thereto for effecting control and management of the data storage subsystem as represented by line 13. The operation and management also requires a set of control tables 15 which store control commands and other parameters received from the host processors, status information about the data storage subsystem, as well as other parameters useful for operating a data storage subsystem, all as is known.

To enhance the performance of the data storage subsystem, a cache 17 is logically and electrically interposed between DASD 11 and the attachment 10. Operation of a cache 17 is also described in the documents incorporated by reference. Programmed control 12 has additional control programs named sequential programs (seq pgms) 24 for managing the cache as well as controlling the DASD 11 in accordance with the present invention. Data transfers are also more complex. Programmed control 12 exercises control of the transfer of data between DASD 11 and cache 17 as symbolized by line 18. The transfer of data between host processor 10 and cache 17 is also controlled as symbolized by line 19. The control for transfer of data directly between host processors and DASD 11 continues as symbolized by line 13. Various data promotion and demotion algorithms relate to the transfer of data symbolized by line 18. Promotion is transfer of data from DASD 11 to cache 17 whereat it can be readily accessed by a host processor via attachment 10. Demotion of data, or cast out of data, is a transfer of data from cache 17 to DASD 11. The transfer of data from cache 17 to DASD 11 is usually accompanied by deallocating the data storage space in cache 17 for making room for other data which host processors may wish to read data from or record data into.

The access to cache 17 is under control of a directory 22 and a scatter index table (SIT) 23. Such access is described by Benhase et al in U.S. Pat. No. 4,464,713. According to that patent, the cache 17 which stores data intended for or residing in DASD 11 is accessible by using the addresses for such data of DASD 11. Directory 22 is a table which allows translation of the DASD 11 addresses to the physical cache 17 addresses. Because of the relatively large size of a cache 17 (50 megabytes or more for example), a hashing technique as shown by Benhase et al is employed. This hashing includes a scatter index table 23 for accessing directory 22 in a minimal time. Another factor with using the Benhase et al invention in the peripheral data storage subsystem is that the SIT 23 entries within a cylinder are contiguous as are the tracks in DASD 11. That is, if a current track stored in cache 17 is being accessed, then the two tracks immediately adjacent to the current track, as physically located in DASD 11, are identified in adjacent registers of SIT 23. In fact SIT 23, as explained later, has a doubly linked list for readily accessing the directory 22 entries.

The additional programming included in programmed control 12 for implementing the present invention is diagramatically illustrated as the SEQ PGMS 24 (sequential programs). Such SEQPGMS 24 are actually embedded into the control programs 14 and may be located in several diverse and separated locations within programs 14. For purposes of understanding the present invention, sequential programs 24 are broken out separately and illustrated as machine operations in FIG. 4. Machine operations are the results of programmed control 12 reading the sequential programs and exercising control over the data storage subsystem in response to reading such sequential programs.

Figure 2:
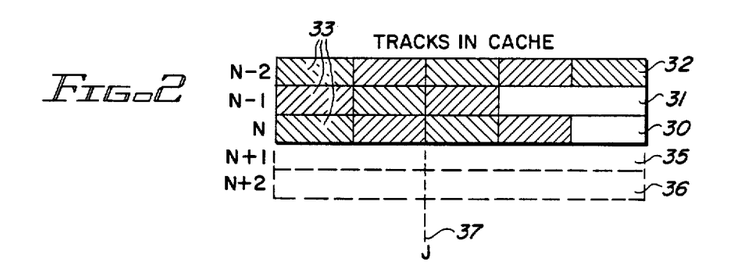
FIG. 2 diagramatically illustrates a locality of references for a data storage subsystem shown in FIG. 1.

The success of the present invention is based in part upon an observation of the peripheral data storage subsystem called locality of references. Such locality of references results from the fact that a given process being executed in a host processor connected to a peripheral data storage subsystem tends to record into and read from addressable data storage areas having contiguous addresses. This is observation particularly true for those processes which sequentially process data, as explained in the prior art. FIG. 2 diagramatically illustrates a principle of locality of references. The tracks in cache are those tracks 30-32 which are in solid lines while the tracks next to be accessed 35-36 are indicated by dash lines. The tracks are shown as being adjacent because of the contiguous addresses in DASD 11; in cache 17 such tracks may be in diverse locations indicated by directory 22, but for purposes of discussion, they are logically adjacent and physically adjacent in DASD 11. A currently accessed track 30, also referred to as "N", is the last cache track accessed which is to be analyzed for sequential properties. To do this analysis, the previously accessed tracks 31-32, which respectively have addresses in DASD 11 one less and two less than the physical address of current track 30, are combined with track 30 into a selected group of cache tracks 20 for analysis of host processor access extents. Track 31 is termed N-1 for indicating the relative address in DASD 11 of that track with respect to the current track 30 while track 32 is termed N-2. The hashed portions 33 indicate those records of data bytes in tracks 30-32 which have been accessed by the host processor. It can be seen that track 32 is 100% accessed, track 31 is 60% accessed, while track 30 is 80% accessed. The different groups of hashing 33 indicate respective records using the count key data (CKD) format as found in DASD 11 used by International Business Machines Corporation. CKD architecture allows for variable length records. For a given process being executed in the host processor, the records involved generally are of the same length but vary between processes or portions of processes in accordance with programming designs. Another type of architecture is so-called fixed block architecture which breaks the data storage areas into fixed lengths, such as for storing 512 bytes, 2000 bytes and so forth. Such fixed block architecture, while easier initially to implement, does require a greater amount of data storage area per user byte to be stored. Accordingly, for high performance data processing, the CKD architecture is preferred. However, for practicing the present invention either architecture or format can be used, as well as other data formats.

After programmed control 12 has examined the access extents of tracks 30-32, it calculates, according to the sequential programs 24, a promotion factor PF for the current track 30.

Such promotion factor determines the number of tracks, having addresses contiguously higher than the current track, to be promoted into cache 17 from backing store 11. It may also be used for indicating the number of tracks to be deleted that had previously been read or written to, such as tracks 31-32. As seen in FIG. 2, track 35 of DASD 11 has address N+1 and would be the first track of data to be promoted to cache 17. Similarly, second track 36 having an address N+2 would be a second track of data to be promoted to cache 17. Of course, if the data in DASD tracks 35, 36 are already stored in cache 17, the promotion is dispensed with. In accordance with the invention, if the access extents 33 of the tracks in the selected group 30-32 indicate a relatively high rate of sequential processing, then the contents of both DASD tracks 35-36 are promoted to cache 17. For a smaller access extents indicating a slower rate of host processor input/output sequential data transfers, then the data contents of track 35 are only promoted to cache 17. In this manner, the present invention allows tailoring the prefetching to the actual execution rate of the host processor process for optimizing not only the performance of the process within the host processor, but also data occupancy of cache 17.

In accordance with one embodiment of the invention, the host processor access extent of a given cache track during its current allocation to a DASD track is used as a trigger mechanism for determining whether or not a sequential mode should be considered and established for the current track 30. An individual access extent threshold J represented by dash line 37 is first examined for the current track 30. As shown in FIG. 2, the access extent threshold or trigger is 40%. This figure is arbitrarily chosen for purposes of illustration only. The trigger indicates that for the cache 17 involved, i.e., the size of the cache, the empirically determined characteristics of the processes being supported by the data storage subsystem and other host processor parameters to be empiracally determined, that access extents less than the trigger level 37 indicate a sequential data processing rate is insufficient rate to justify prefetching data to cache. On the other hand, with access extents greater than the trigger 37 indicate than an access extent analysis is required. It is not desired to make a decision on a single cache track access extent, but on a group of selected tracks to obtain a more meaningful decision. When all of the tracks 30-32 in the selected group have an access extent greater than J, then the combined access extent for all of the tracks is calculated, otherwise, the implicit sequential ode is not entered into, as will become apparent.

Figure 3:
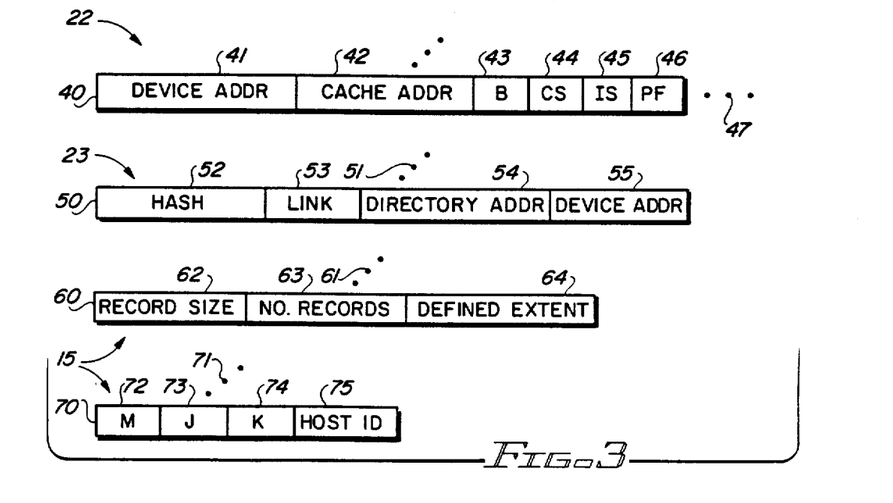
FIG. 3 is as simplified diagram showing some control tables of the FIG. 1 illustrated data storage subsystem usable with the present invention.

Programmed control 12 has a large number of control tables 15 in addition to directory 22 and SIT 23 to operate the data storage subsystem. Those portions of the directory, SIT and control tables pertinent to an understanding of the present invention are shown in FIG. 3, it being understood that in a practical embodiment the actual number of control tables will be much greater than that shown in FIG. 3. A single entry 40 of directory 22 is shown, it being understood there is a single entry for each of the addressable data storage areas or tracks in cache 17. This fact is indicated in FIG. 3 by the unnumbered ellipsis. Directory entry 40 which can be considered as being for the current track 30 includes device address field 41. Device address field 41 includes the address of DASD 11 together with the head address within the cylinder and the cylinder address also referred to as DCCHH wherein D is the actual address of the DASD storage unit, C is the two byte cylinder address and H is the two byte head or surface address. Cache address field 42 is optional and is used only when the offset address of directory entry 40 from a base directory address does not implicitly or impliedly point to the physical address of the cache storage area represented by entry 40. B byte 43 indicates that the data stored in the cache area indicated by field 42 is bound or fixed into cache and cannot be discarded, demoted or cast out from the cache. When the B byte is unity, then the later-described data demotion operation will not be performed on those areas of cache. CS byte 44 indicates that the mode of operation for the data area indicated by field 42 is a commanded sequential. This means that the host processor has sent an indication to the programmed control 12 indicating that the mode of operation is commanded sequential. Such a commanded sequential operation is shown in Tayler, U.S. Pat. No.

Figure 4:
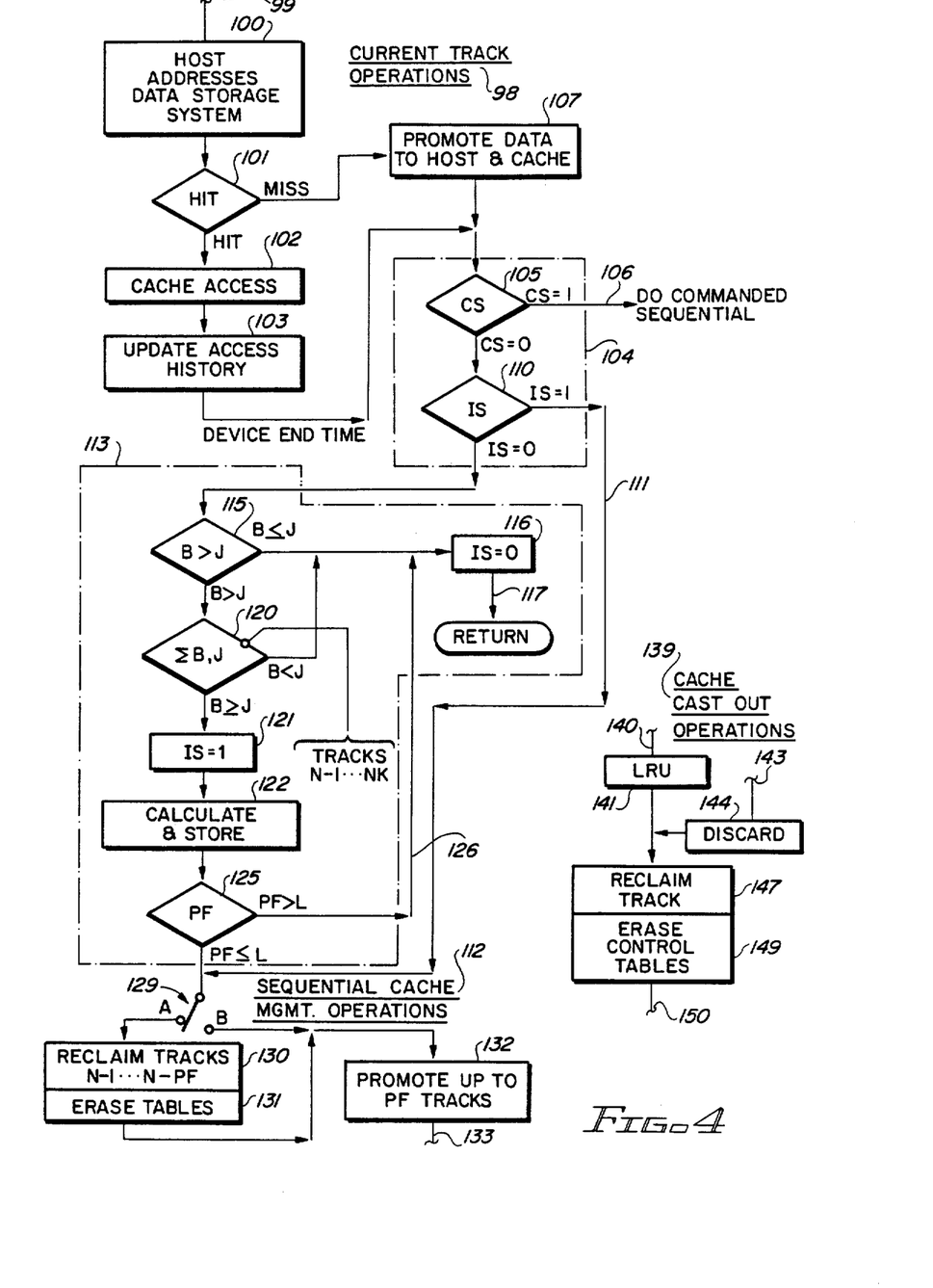
FIG. 4 is a machine operations chart showing implementation of the invention in the FIG. 1 illustrated data storage subsystem.

4,414,644. IS field 45 indicates that the mode of operation for the data area represented by entry 40 is implied sequential and is set in accordance with the present invention as illustrated in FIG. 4. In some embodiments of the present invention, a commanded sequential operation as set forth in Tayler supra is dispensed with. In this instance a single bit in entry 40 indicates a single sequential mode. The mode of operation for a commanded sequential and the implied sequential mode is then identical. PF field 46 contains the promotion factor PF to be used in connection with the implied sequential mode of operation. In the event of a single bit indicated sequential mode, a PF value of unity or 2 can be always made for the commanded sequential mode or the PF factor can be provided by the host processor with the sequential bit. Ellipsis 47 indicates that each directory entry 40 includes additional fields not shown in FIG. 3. As an example, the entries can be singly or doubly linked together based upon device address 41 or other parameters as may be desired. By linking with device address 41, the next higher and next lower DASD 11 address will be the logical neighbors of entry 40 in the linked list such that the logical connection is a faster connection for finding the contiguously addressable DASD 11 data areas that are assigned to cache 17.

A portion of SIT 23 is shown as a single entry 50 with additional entries of sit 23 being indicated by ellipsis 51. A hash address 52 is self-identifying data for the SIT address. Link field 53 provides for either single or double linking, as is well known. The directory address field 54 indicates the offset address of entry 40 for example, from a base address for the entire directory 22. Device address 55 indicates the device address and corresponds to field 41 of entry 40. In some instances, device address 55 may be dispensed with.

Control tables 15 store a lot of control parameters as can be determined from the cited prior art and other known patents showing cached peripheral data storage subsystems. Illustrated are two sets of registers of interest to practicing the present invention. It is to be understood that instead of storing the data in these separate registers, the data described may be stored with a directory entry 40 or with a SIT entry 50, as may be desired. A first register set includes the illustrated register 60 and additional registers represented by ellipsis 61. Register set 60, 61 stores the access extent values for the individual cache storage areas of cache 17. Record size field 62 indicates the measured size of record used in the CKD architecture. For a fixed block architecture size, a single entry in programmed control 12 indicates the size of the fixed block used. No. records field 63 indicates the number of records accessed for a given addressable data storage area of cache 17. Defined extent field 64 indicates the boundary addresses of a defined extent as set forth in U.S. Pat. No. 4,262,332, which defines the limit of operations for a process currently accessing the data storage areas in the subsystem. The defined extent is expressed in backing store addresses. There is one register 60 for each of the cache data storage areas. Accordingly, the register 60 is a candidate for including with the directory entry 40.

A second register set, including a register 70, stores data related to parameters used in calculating the promotion factor stored in field 46. Ellipsis 71 indicates that additional registers may be employed for storing these parameters. The first parameter is stored in field 72 called M. Parameter M, which can be empirically determined, is used for expanding the analyzed access extents for increasing the number of tracks to be promoted to cache for given measured access extents. The selection of the number for M is based in part upon the data storage capacity of cache 17; a larger cache 17 makes M larger. If a large cache 17 is employed, then additionally stored promoted data may provide for additional cache hits for increasing overall performance. It is believed that the smallest number that M should be selected is 2 for providing a reasonable improvement in sequential data processing. A second field J 73 stores the threshold value corresponding to the threshold indicated in FIG. 2 by dash line 37. The proportional value of J in FIG. 2 is indicated as being 40%. Other selections can be higher, for example, 50%, 60% or 70% depending upon the empirical experience with implementing the present invention. It is believed that values lower than 40% may prematurely institute an implied sequential mode of operation. However, it is conceivable that systems could employ lower thresholds than the illustrated 40%.

Field K 74 indicates the number of data storage areas in cache 17 that are to be examined as a selected group. The number of such additional areas or tracks of cache 17 is at a preferred minimum of unity and a maximum of 3 or 4. Accordingly, in accordance with the preferred mode of operation, a selected group would have a minimum of 2 tracks of cache 17 stored data and a maximum of 5, no limitation thereto intended. Host ID field 75 can identify a process in a host processor with which the parameters M, J and K will be employed. In an early embodiment, a single set of parameters M, J and K were used for all host processors. As the operational capability of host processors being more divergent, it may be desired to have different values for the different host processors since the host processors identify themselves in each request either implicitly or explicitly. The programmed control then can select an M, J and K value for the respective host processor to accommodate a wide range of computing capabilities. If greater refinement is produced, the host ID 75 may include classes of processes as indicated to the programmed control 12 based upon either a subchannel assignment (implicit) or within a commanded set up (explicit). This description assumes that M, J and K have the same values for all host processors.

FIG. 4 illustrates the machine operations represented by the sequential programs 24 of FIG. 1. It was stated that the sequential programs are interleaved into the control programs 14. It is preferred that a portion of the sequential programs be incorporated with command execution for data transfers between host processor and the data storage subsystem of FIG. 1. An example of such interleaving is shown in the Tayler patent No. 4,414,644 in its FIG. 5. Therein is shown a command decode at 17 which proceeds through a series of machine operations for transferring data to a host at step 103. Upon completion of that data transfer to the host, other machine operations follow. It is at this point that the sequential programs 24 could be executed. It is preferred that the interleaving of the sequential programs 24 is upon completion of a data access to cache as shown in FIG. 4. Yet other portions of sequential programs may be executed at yet other times based upon well-known systems of dispatching computer control operations, known in the prior art, and not described for that reason.

A set of current track operations 98 is first described. Entry into the current track operations is from decoding a command received from a host processor, as represented at entry point 99. In this instance, as indicated at step 100, the host is addressing the data storage subsystem for accessing an addressed data storage area for either a read or a write operation. At step 101, programmed control 12 determines by examining directory 22 whether or not a data storage track has been allocated in cache 17 for the backing store address sent by the host processor along with the received command. If there is an allocated area in cache 17, a so-called cache hit occurs, otherwise a cache miss occurs. First it is assumed that a cache hit occurs, i.e., cache 17 has a data storage track allocated in cache 17 for the DASD 11 address received with the command. At step 102, programmed control 12 allows cache access by the host processor to the addressed DASD 11 track contents stored in cache 17. Such operations are as described by Benhase et al in U.S. Pat. No. 4,464,713. Upon completion of that access, which also corresponds to the data transfer step 103 of Tayler patent, some programmed control 17 data processing functions are performed at step 103 which includes updating the access extent history within control tables 15. For example, during the cache access step 102, programmed control 12 monitors the size of the record being transferred as well as the number of records. Usually there is one record transferred per channel command, as an example, no limitation thereto intended. Therefore, as a part of post-data transfer operation, programmed control 12 updates a register 60 which corresponds to the register 40 of directory 22 used to access the track of cache 17. Upon completing the updates, which may include other data updates, programmed control 12 then detects the mode of operation assigned to the accessed track to cache 17 track in a series of mode examination steps 104. Firstly, at step 105, CS byte 44 is examined to determine whether or not the data transfer is a part of a commanded sequential mode of operation. If CS 44 equals unity, then at line 106 programmed control does the posttransfer commanded sequential operations as set forth in the Tayler patent supra. If CS 44 is 0, then at step 110 programmed control 12 examines IS byte 45. That is, it may have been that the implied sequential mode was set up before completion of the cache access at step 102. If IS is equal to unity, then the implicit sequential mode has already been established for the accessed cache track (note that the mode control is on a cache track basis). Then programmed control 12 follows operations path 111 to perform sequential cache management operations 112, as later described. If on the other hand IS bit 45 is 0, then using later described sequential access detecting step 113, programmed control 12 determines whether or not sequential data access is in fact occurring for the addressed cache 17 track.

Mode detector 104 may only include step 110 in those instances wherein a separately operated commanded sequential mode is not employed. For example, a commanded mode may also set IS bit 45 and the programmed control 12 responds to the "commanded" IS bit being set to set PF field 46 to unity or to 2 depending upon the desired number of tracks to be prefetched into cache 17.

Sequential access detecting steps 113 comprises a first step 115 wherein the current track, i.e., the last track accessed track 30, is examined as to its present host access extent. The value B indicates the number of bytes accessed by a host processor since the current track stored data were promoted to and have been resident in cache 17. The value B is the product of the numbers contained in fields 62 and 63 of the control register 60 assigned to current track 30. Alternatively, the value B can be based upon an actual byte count developed using known techniques for data transferred in or out of the cache 17. Each byte is counted only once regardless of the number of times the byte area in cache is accessed. However, with CKD architecture the number of records accessed at least once is easier to count. In any event, the value B is compared with the threshold J (represented by dash line 37). For a DASD 11 having a track count of 14,000 bytes, then the value J at a 40% threshold is 5,600 bytes that were accessed to exceed the threshold. If the access extent does not exceed the access trigger or threshold J, then programmed controller 12 sets IS byte 45 to 0 (even if the initial value is 0) and returns to other programs 14 as indicated by line 117. The practical effect of this return is to keep the management of cache insofar as current track 30 is concerned in the random access mode.

The measured access extents can represent either of two types of measurements on the cache tracks. In a first preferred measurement mode the total number of bytes transferred at least once between a host processor and cache 17 are counted. This means that if a first one-fourth of a cache track were read by host processor followed by a write to the first one-fourth of a cache track, the measured access extent of that cache track is one-fourth or 25%. In a second measurement mode, the measured access extent represents the total number of bytes transferred even though the same bytes are repeatedly transferred are counted. Taking the example of a one-fourth track access, using the second measurement mode results in a measured access extent of one-half or 50%.

On the other hand, if at step 115 the measured access extent of current track 30 exceeds threshold J, then programmed processor 12 analyzes the immediately lower addressed tracks that are currently stored in cache 17. In the event that no adjacently addressed tracks are stored into cache 17, i.e., there are no allocated tracks 31 and 32, then from step 120 programmed control 12 proceeds through step 116 to return path 117. If in the examination of the directory 22 or SIT 23 tracks 31 and 32 are in fact resident in cache 17, then programmed control 12 compares the measured access extents for the tracks 31 and 32 up to the value of K track for determining whether or not the access extents of the selected group of tracks should be combined. Assume that K equals 2, then the access extents of the tracks 31, 32 are individually checked against the threshold J. As shown in FIG. 2, their access extents both exceed the threshold J which indicates that an implicit sequential mode is possible. On the other hand, if either of the access extents in tracks 31 or 32 were below the threshold J, then programmed control 12 proceeds to step 116 thence return path 117 for keeping the current track in the random access mode.

Assuming that the measured access extents of tracks 30-32 all on an individual basis exceed threshold J, then at step 121 program processor 12 sets IS byte 45 to unity for indicating the implicit sequential mode for the current track 30. Then a step 122, programmed processor 12 calculates the promotion factor PF for field 46 corresponding to current track 30. In the current embodiment, equation 1 set forth below is solved.

$$PF = \frac{M B(30-32)}{T} \quad ; \quad (1)$$

wherein PF is the promotion factor in tracks, M is the look ahead factor stored in field 72 of control register 70, B is the access extent in bytes for the tracks 30–32 which constitute the selected group of tracks in calculating the prefetched quantity for the implicit sequential mode. The denominator T is the current track data storing capacity. The quotient is rounded to the closest integer. For example, if MB/T=2.5, then 3 tracks are prefetched. However, if the quotient is 2.2, then the number of tracks is rounded to 2. The PF value set forth in tracks is then stored in field 46. Other equations and algorithmic procedures may be used in calculating the performance factor. In any event, the promotion factor has a figure of merit greater than the access extents for all of the tracks in the selected group of tracks 30–32. In some situations, the value of K is preferred to be unity. In such a selection, the selected group tracks then constitute current track 30 and N-1 track 31. In other situations, the value of K may be 0 such that only the access extent of current track 30 is employed. It is preferred that more than one track be used in the analysis.

After storing the PF value in field 46, programmed processor 12 proceeds to step 125 for comparing the PF factor with respect to a PF limit "L". This comparison step creates a window of operation for declaring an implicit sequential mode of operation, i.e., the J factor indicates a lower level while the L limit indicates an upper level. As an example, the limit L may be equal to 3, i.e., no more than 3 tracks of data should be prefetched from DASD 11 to cache 17 that have 3 increasing contiguous DASD addresses greater than the DASD 11 address for current track 30. If the PF value in tracks is greater than the limit L (which is stored in a control register not shown in FIG. 2), then programmed control 12 proceeds over path 126 through step 116 to return path 117. The practical effect of this arrangement is to prepare the cache for implicit cache bypass. Implicit cache bypass can be determined in one of several ways, one of which is shown in U.S. Pat. No. 4,500,954 for an implicit cache bypass whenever a write miss occurs.

In this regard it should be noted that the general mode of operation is that a host processor first reads data from DASD 11 through cache 17. During this set of reads it may be determined that the mode of operation of the process within the host processor is a sequential mode of operation meeting the implicit sequential mode requirements. Once the IS byte 45 is set to unity, that mode selection carries forward to the ensuing recording or writing steps when host processor stores updated data in cache 17. During such writing sequences, when the IS byte 45 is 0 and there is a write miss in cache 17, then for the remainder of the cylinder writes (see U.S. Pat. No. 4,500,954) cache 17 is bypassed for making an efficient extra long transfer of sequential data from the host processor to DASD 11 by bypassing cache 17.

On the other hand, when the calculated PF for the current track 30 is less than or equal to the limit L, programmed control 12 proceeds to the sequential cache management operations 112, i.e., IS byte 45 is still 1 as detected at step 110. Sequential cache management operations 112 can consist of two different modes of operation. The first mode A as represented by terminal A of program represented switch 129 causes the cache tracks having addresses less than but contiguous with the current cache track 30 to be reclaimed for use in other data processing operations. That is, the data contents of tracks 31 and 32, for example, would be demoted from cache 17 to DASD 11 and deallocated from cache, i.e., made free for other allocations. This action is indicated in step 130 representation as reclaiming tracks N-1 through N-PF where PF is the calculated promotion factor for the current track. Step 130 can be modified such that track N-1 stays in the cache 17 making the reclaimed tracks tracks N-2 through N-PF. Upon completion of the reclaiming or casting out of the data of lower addressed N-1 to N-PF tracks, programmed control 12 at step 131 erases the tables associated with the reclaimed tracks, such as a directory 22 entry, the SIT 23 entry and registers 60 and 70 of control tables 15 that appertain to those reclaimed tracks. Following the reclaiming of tracks, the data stored in the tracks 35–36 of DASD 11 are then promoted in step 132 into cache 17. This assumes, of course, the calculated PF is 2 such that 2 tracks should be promoted. Of course, before the promotion, programmed control 12 examines directory 22 to determine whether or not either or both of the tracks 35, 36 are already allocated in cache 17. If so, the data promotion is dispensed with. Following the promotion of data, the implicit sequential operation for the current track being accessed and for the current cache head is complete. Accordingly, at exit point 133 programmed control 12 returns to control programs 14.

On the other hand, when the program representative switch 129 is set to terminal B, then the reclaiming steps 130, 131 are dispensed with and only the data promotion step 132 is performed. In this situation, the reclaiming of tracks in cache 17 are based upon aging algorithms often referred to as least recently used (LRU) algorithms as will be explained later with respect to the continued description of FIG. 4. Program switch 129 can be set to either terminals A or B for all of the host processors as indicated with the present description; however, switch 129 can be actuated to either terminals A and B in accordance with the host ID 75 as shown in FIG. 3.

Returning now to step 101, the description assumes that rather than a cache hit a cache miss occurs. That is, the DASD address supplied by the host processor in requesting a data transfer operation identifies no allocated track space in cache 17. This cache miss is true for either a read operation or a write operation. For a write operation, according to the cache bypass principle set forth in U.S. Pat. No. 4,500,954, a cache bypass may occur. In that case, the implicit sequential mode is not addressed since access to the data area of DASD 11 does not involve cache 17. On the other hand, if the commanded transfer operation is a read, then cache 17 continues to be involved with a possible implication for the implicit sequential mode. Also, in a write operation, the bypass may not be implemented for a write miss. In that case, the implicit sequential mode analysis will also be conducted.

In any event, assuming that a cache bypass is not instituted because of the cache miss, at step 107, programmed control 12 promotes data from DASD 11 directly to the host processor with a copy of such going to an allocated track of cache 17.

In that case, track 30 receives the data to become the current track. In a case of a write miss, it may be decided through architectural decisions that instead of going directly to DASD 11, space will be allocated within cache 17 for receiving the written data with the written data being later transferred or demoted to DASD 11 from cache 17. In this case, step 107 consists of receiving data into the allocated space of cache 17 directly from host processor over attachment 10. Upon completion of the allocation of a new track into cache 17 through the execution of step 107, sequential mode detector 104 is executed by programmed control 12. This execution may occur (as measured in electronic terms) a substantial time after the promotion of data into cache 17 from either the host processor or from DASD 11. Such promotion does not result in any entry being made in register 60 as to field 63, i.e., is not a host access to cached data. However, the record size 62 can be measured when CKD architecture is employed. Because of the delay after executing step 107, host processor may actually after a read promotion start writing data back to the same DASD 11 address resulting in the host processor accessing the just promoted data area of cache 17. Accordingly, mode detector 104 is executed followed by the other operation steps set forth in implicit sequential detector 113 and sequential cache management operation 112, as previously described.

Based upon the above description, it is seen that the implicit sequential mode is examined during or in parallel to execution of a channel program resulting in one or more data transfers between a host processor and the peripheral data storage subsystem. Such parallelism in operation from either a cache miss or a cache hit results in timely sequential operation detection. Such parallel operation is not necessary to obtain advantages from practicing the present invention. Rather, the implicit sequential analysis can be analyzed intermediate termination of one channel program (appearing to the peripheral data system as determination of a chained set of peripheral operations) and the onset of a next ensuing chain of peripheral operations. This latter type of analysis timing is shown in FIG. 3 of U.S. Pat. No. 4,466,059. It is important to note that the look ahead factor M should still be used such that the data promotion occurring because of the calculated PF value will not look only to the next ensuing chain of peripheral operations, but to chains of peripheral operations subsequent to the next occurring chain of operations. This is look ahead on efficient utilization of the present invention.

It was earlier mentioned that the sequential cache management operations may not include the automatic reclaiming of the tracks having addresses less than the contiguous width of the current track 30. A LRU or aging algorithm can be used for cache cast out operations. This is shown in the set of machine operations 139. Such LRU operations or cast outs can be performed intermediate data transfer operations when programmed control 12 and other circuits are not busy satisfying the host processor demands for data transfers. In such a system, a dispatcher, a common tool in program control (not shown), of programmed control 12 causes a examination of the cache 17 aging as in an LRU table of known design. This is achieved at entry point 140. Then programmed control 12 executes a set of machine operations LRU 141. LRU 141 represents known operations which include analyzing the aging of the data stored in cache 17. Such aging can be measured elapsed times from the last host access to an allocated track area of cache 17. As a result of such LRU operations, a list of tracks to be reclaimed is generated, such as shown in the Tayler patent, supra. Following the generation of that list, the tracks are in fact reclaimed by programmed control 12 at step 147. Following the actual reclaiming of the tracks, which includes demotion of data from cache 17 to DASD 11 when the copy in DASD 11 is different from the copy in cache 17, programmed control 12 at step 149 erases the corresponding control tables as explained with respect to step 131. Then control programs 14 are returned to at exit point 150. Additionally, a host processor may indicate to a peripheral data storage subsystem that certain allocated tracks of cache 17 may be discarded through a discard command such as shown in Tayler, supra. Upon decoding the received host processor supplied command, programmed control 12 at entry point 143 provides a discard set up at step 144. Such set up is a listing of all of the DASD 11 addresses which might have allocated track space in cache 17 which should be discarded from cache 17. Discard step 144 further includes scanning directory 22 to identify all of the allocated tracks remaining in cache 17. Upon establishing the tracks to be discarded out of cache 17, the reclaimed track step 147 is performed followed by step 149 and exit at 150.

While the invention has been particularly shown and described with reference to preferred embodiments thereof, it will be understood by those skilled in the art that various changes in form and details may be made therein without departing from the spirit and scope of the invention.

What is claimed is:

1. In a method of operating a cache which is interposed between a host processor and a backing store, the cache and the backing store including addressable like-capacity data storing tracks, where a track of data is the amount of data storable on one track of a magnetic disk recorder the cache including means for addressing tracks in the cache using addresses of the backing store whenever the cache tracks are individually allocated for storing data with respect to a respective addressable track in the backing store;

the steps of:
measuring and storing the measurement of those portions of each of said allocated tracks that are accessed by the host processor during the current allocation of the cache track to one of the tracks in the backing store;

selecting a group of the cache tracks that are addressable by contiguous ones of the backing store addresses;

establishing first and second access extent thresholds;

in each of the selected groups, comparing, as at first comparison, the stored measurement for one of the tracks in the selected group with said first access extent threshold, if the first comparison shows that the stored measurement for the one track is less than the first access extent threshold, operating the cache for said one cache track in a random access mode, if the first comparison shows that the one cache track stored measurement is greater than the first access extent threshold, then combining the stored measurements for all cache tracks in the group having the one cache track; and comparing, as a second comparison, said combined stored measurement with said second access extent threshold, if said second comparison shows that the combined measurement exceeds said second access extent threshold, preparing the cache for cache bypass operations, if said second comparison shows that the combined measurement is not greater than said second access extent threshold, then establishing for tracks in the backing store having addresses contiguous with the backing store address of the one cache track a predetermined requested data promotion and demotion algorithm.

2. In the method set forth in claim 1, wherein said combining step includes summing the stored measurements for all of the tracks in the selected group;
establishing a look-ahead factor;
multiplying the sum with said look-ahead factor to obtain a promotion factor; and
promoting the data from a number of backing store tracks to the cache store having backing store addresses contiguous but increasingly greater than the backing store address of said one track.

3. In the method set forth in claim 2, further including the steps of:
maintaining a number of cache tracks in selected groups to be a constant number and including demoting tracks from the selected group to the backing store to accommodate the tracks promoted from the backing store to the cache store in accordance with said promotion factor.

4. In the method set forth in claim 3, further including the step of:
limiting the number of tracks in the selected group to be not greater than ten tracks.

5. In the method set forth in claim 4, further including the steps of:
establishing first and second addresses between which all data transfer operations are to occur with backing store addresses lying between said first and second addresses; and
promoting said tracks having increasingly greater contiguous addresses to the one track up to and including but not exceeding said second address.

6. In the method set forth in claim 5, further including the steps of:
demoting from said selected group and removing from said selected group tracks having lower backing store addresses within the selected group beginning with a backing store address equal to two less than the backing store address of the one track and ending with the backing store address which is equal to the promotion factor, in tracks, subtracted from said backing store address of the one track.

7. In the method set forth in claim 5, further including the steps of:
establishing a replacement procedure for all allocated cache tracks in the cache store, said replacement procedure including measuring the time of residency of the cache track since the last host processor access and removing by demoting data from the oldest cache resident tracks and deallocating the oldest cache resident tracks for freeing the oldest cache resident tracks for reallocation, such demotion procedure including the tracks within the selected groups.

8. In the method set forth in claim 5, further including the steps of:
including in said measuring step, the measurement of data transfers to identical portions of each of the allocated tracks such that multiple transfers to an identical portion add to said access extent for the given track; and
including measuring data transfers to and from the same portions of the respective allocated track such that multiple transfers which such same portions add to the access extent for the respective tracks in cache; and
measuring data transfers for accesses to the cache which are host explicit or implicit wherein the implicit transfers are data transfers from the backing store to the cache store and the explicit transfers are directly between the host processor and the cache store.

9. In the method set forth in claim 1, further including the steps of:
receiving from said host processor a commanded sequential mode of operation to promote data from the backing store to the cache store for accommodating a commanded sequential mode of operation; and
promoting data from the backing store to the cache store in accordance with said comparing step and repeating the measuring steps for all cache tracks related to and included in said commanded sequential mode of operation.

10. In the method set forth in claim 1, further including the steps of:
receiving from said host processor a commanded sequential mode of operation for identified backing store addressed tracks;
establishing a commanded sequential bit and an implicit sequential bit, setting the commanded sequential bit upon receiving the received commanded sequential mode for those tracks identified and setting the implicit sequential bit as a result of said comparing step indicating a sequential mode;
promoting data from the backing store to the cache store in accordance with said commanded sequential mode using a process unique to the commanded sequential mode and different from the implicit sequential mode; and
executing said measuring step for the tracks included within said commanded sequential mode.

11. In the method set forth in claim 1, further including the steps of:
establishing for all cache tracks allocated for backing store tracks a cache replacement algorithm wherein data stored in allocated ones of the cache tracks are demoted to the backing store and such demoted tracks are then deallocated from the cache; and
applying said replacement procedure to all tracks in the cache irrespective of the mode of operation thereof.

12. In the method set forth in claim 1, further including the steps of:
establishing for all tracks in the cache a replacement procedure for demoting data from the allocated tracks and deallocating the tracks storing the data, said procedure including determining the elapsed time since the last host processor access to the respective allocated track and replacing those tracks having the longest elapsed time since a last host access;
a command bit for indicating a commanded sequential mode of operation;
an implicit bit for indicating an implicit sequential mode of operation;
receiving a command from the host processor for commanding a sequential mode of operation and setting said command bit, in response to a set command bit promoting data from the backing store to the cache store in accordance with a predetermined promotion algorithm different from the promotion of data from the backing store to the cache store resulting from the comparing step; and when said comparing step indicates that the combined measurement is greater than the first threshold and less than the second threshold, setting said implicit bit, then promoting data from the backing store to the cache store when the implicit bit is set in accordance with the algorithm set forth for the comparing step irrespective of whether or not a comparing step was executed; and establishing a bypass bit;

setting a bypass bit whenever said comparison indicates the combined measurement is greater than the second threshold for said one track.

13. In a method of operating a cache store connected to and electrically interposed between a using unit and a backing store, the cache store having a large plurality of addressable data storing tracks, where a track of data is the amount of data storable on one track of a magnetic disk recorder, each of the tracks having a predetermined data storing capacity;

said using unit accessing the data storing tracks for reading data stored therein and for writing data therein;

the machine-executed steps of:

monitoring the accessing of the data storing tracks by the using unit including identifying which of the data storing tracks are accessed and the extent of each such access;

separately summing for each of the data storing tracks the monitored access extents and separately storing the sums as current access extents for the respective data storing tracks;

for each of the data storing tracks, establishing an access threshold which if exceeded indicates a possible sequential mode of using unit access to data stored in data storing tracks having addresses within a locality of references, establishing a locality of references for each of the data storing tracks as a predetermined range of contiguous addresses for data storing tracks which range includes the address of said each respective data storing track;

after each attempted access to each of said data storing tracks, defining such data storing track as a current track for purposes of comparing predetermined current access extents with predetermined access thresholds;

comparing the current access extent for the current track with said access threshold, whenever the current access extent exceeds said access threshold for the current track, determining said locality of references for the current track, then comparing the respective current access extent of each data storing track in cache within said locality of references for the current track, if all of the addresses of data storing tracks within said locality of references for the current track are in fact in cache and if the respective current access extents for each of the data storing tracks in said locality of references respectively exceed the respective access threshold for such data storing tracks, then indicating that the using unit is sequentially accessing data stored in the data storing tracks within said locality of references of the current track; and summing the current access extents for the data storing tracks within said locality of references and using the current access extent sum to indicate a rate of sequential access by the using unit within said locality of references of the current track.

14. In the method set forth in claim 13, further including the steps of:

transferring data between the cache store, the backing store and a using unit in a series of equal sized records, identifying the records;

in said monitoring step, measuring the extent of each such access by counting the equal sized records transferred between the using unit and the cache store and summing the number of records transferred for indicating the extent of such each access and including summing the sum of each access for generating the current access extents and storing size of the record with the respective current access extent.

15. In the method set forth in claim 13, further including the steps of:

transferring data in constant size records each having a predetermined number of bytes of data between the using unit and both the said stores;

in said monitoring step, monitoring the accessing and measuring the extent by counting the number of records transferred between the using unit and the cache store irrespective of the portion of the data storing track in the cache store that receives or yields the record being transferred such that a plurality of transfers of a single record adds to the current access extent for the data storing track and cache with which transfers.

16. In the method set forth in claim 13, further including the steps of:

in said monitoring step, for each attempted access by the using unit to the cache store, monitoring the access including each access wherein the cache store has an allocated data storing track for the attempted access whether recording or reading; and wherein the attempted access includes wherein the cache store has no allocated data storing track for the attempted access, then transferring data from the backing store directly to the using unit and placing a coy into the cache store after allocating a track thereto, upon completion of the transfer from the backing store to the cache store and using unit, performing said comparing step.

17. In the method set forth in claim 13, further including the steps of:

after performing the comparing step, but before performing the indicating step;

summing the current access extents for all of the tracks within the locality of references to create a rate access indicator, calculating a number of tracks to be promoted having backing store addresses contiguous but increasingly greater than the largest backing store address within the locality of references by taking the rate access indicator and multiplying the same by an arbitrary and predetermined constant for obtaining a number of bytes to be prefetched into the cache store, dividing the number of prefetch bytes by the capacity of the data storing tracks to obtain a number of tracks to be promoted into the cache store; and then performing said indicating step.

18. In the method set forth in claim 17, further including the steps of:

taking the number of the tracks to be promoted, subtracting one from that number and then demoting from the cache store to the backing store tracks within the locality of references beginning with the track having a backing store address two less than the largest backing store address track in the locality of references and proceeding to cache tracks accessible by increasingly smaller addresses within the locality of references; and adding the prefetched tracks to the locality of references such that the number of tracks within the locality of references is a function of the calculated rate access indicator.

19. In the method set forth in claim 18, further including the steps of:

receiving from the using unit a command indicating a defined extent of operations for transfer of said constant size records having a lower backing store address equal to a first address and a maximum backing store address equal to a second address; and limiting the prefetching and demotion of cache tracks respectively to be numerically between the second and first addresses.

* * * * *